United States Patent

Nakamura et al.

[11] Patent Number: 5,956,155
[45] Date of Patent: Sep. 21, 1999

[54] FACSIMILE APPARATUS HAVING A MODEM FUNCTION

[75] Inventors: Mitsuhiro Nakamura; Kohichi Shibata, both of Osaka, Japan

[73] Assignee: Mita Industrial Co., Ltd., Osaka, Japan

[21] Appl. No.: 08/732,588

[22] Filed: Oct. 15, 1996

Related U.S. Application Data

[63] Continuation of application No. 08/398,787, Mar. 6, 1995, abandoned.

[30] Foreign Application Priority Data

Mar. 11, 1994 [JP] Japan .................................. 6-041199
Mar. 15, 1994 [JP] Japan .................................. 6-043458

[51] Int. Cl.⁶ .............................. H04N 1/00; H04N 1/32; H04M 11/00
[52] U.S. Cl. .......................... 358/442; 358/400; 358/468; 379/93.09; 379/100.15
[58] Field of Search .................................. 358/434, 435, 358/436, 442, 468, 400; 379/93.05, 93.09, 100.01, 100.15

[56] References Cited

U.S. PATENT DOCUMENTS

| | | | |
|---|---|---|---|
| 4,652,933 | 3/1987 | Koshiishi | 358/442 |
| 4,816,911 | 3/1989 | Kirsch et al. | 358/400 |
| 4,964,154 | 10/1990 | Shimonoto | 358/442 |
| 4,991,200 | 2/1991 | Lin | 358/442 |
| 5,041,918 | 8/1991 | Ishida et al. | 358/442 |
| 5,241,403 | 8/1993 | Ishikawa | 358/440 |
| 5,257,117 | 10/1993 | Kang et al. | 358/468 |
| 5,303,067 | 4/1994 | Kang et al. | 358/442 |
| 5,448,378 | 9/1995 | Matsumoto | 358/468 |
| 5,452,106 | 9/1995 | Perkins | 358/468 |
| 5,608,546 | 3/1997 | Nakamura et al. | 358/468 |
| 5,740,336 | 4/1998 | Wakisaka et al. | 358/442 |

*Primary Examiner*—Kim Yen Vu
*Assistant Examiner*—Kimberly A. Williams
*Attorney, Agent, or Firm*—Smith, Gambrell & Russell, LLP; Beveridge, DeGrandi, Weilacher & Young Intellectual Property Group

[57] ABSTRACT

In a facsimile apparatus having a facsimile modem function for a personal computer to perform communications through the facsimile apparatus, the changeover between a facsimile mode and a facsimile modem mode is automatically made based on whether an AT command is transmitted from the personal computer or not. When an AT command is received while the facsimile apparatus is in the standby state in the facsimile mode, the operation mode is changed to the facsimile modem mode to execute the command. When no AT command is received within a predetermined period of time after the execution of the AT command, the operation mode is returned to the facsimile mode. In changing the mode, the facsimile apparatus is disconnected from the telephone line.

17 Claims, 7 Drawing Sheets

FACSIMILE APPARATUS HAVING A MODEM FUNCTION

This application is a continuation of application number 08/398,787, filed Mar. 6, 1995, now abandoned, which application is entirely incorporated herein by reference.

BACKGROUND OF THE INVENTION

1. Field of the Invention

The present invention relates to a data communications apparatus which performs data communications through the telephone line and that is connected to an external information processor such as a personal computer for the external information processor to perform communications through the data communications apparatus, and more specifically, to a facsimile apparatus provided with a facsimile modem function.

2. Description of the Prior Art

A function to directly facsimile-transmit an original such as a document and a drawing made on a personal computer and to receive image data facsimile-transmitted over the telephone line to directly input them to the personal computer is called a PC-FAX function. The PC-FAX function is realized by connecting a personal computer to a facsimile apparatus having a data communications port such as an RS-232C port to use the facsimile apparatus as a facsimile modem.

In connecting a personal computer to a facsimile apparatus, an expansion board provided with an internal register is connected to, for example, an RS-232C port of the facsimile apparatus. The personal computer is connected to the facsimile apparatus through the expansion board, and the expanded function is allotted to a key of an operation unit of the facsimile apparatus.

By attaching the expansion board, various expanded functions are performed such as a function for the personal computer to transmit data via the facsimile apparatus, a function for the personal computer to receive data via the facsimile apparatus, a printer function to use the facsimile apparatus as a printer of the personal computer, and a scanner function to use the facsimile apparatus as a scanner for inputting images to the personal computer. Thus, a recording unit and an original reading unit of the facsimile apparatus can be used also as a printer and a scanner which are necessarily prepared on the side of the personal computer originally, so that it is unnecessary to prepare the expensive peripheral devices, which is very advantageous.

A facsimile apparatus connected to a personal computer operates in two modes: a normal mode (facsimile mode) in which the facsimile apparatus operates alone without performing any data communications with the personal computer; and a PC-FAX mode (facsimile modem mode) in which the facsimile apparatus performs data communications with the personal computer. The changeover between these two modes is made through control from the personal computer by using control commands called AT commands. The facsimile apparatus is usually in the normal mode. The mode is changed to the PC-FAX mode when data of the personal computer is transmitted through the facsimile apparatus or when data received by the facsimile apparatus is transmitted to the personal computer.

When the facsimile apparatus receives an AT command from the personal computer in a standby state where the facsimile apparatus performs no operation, no problem is caused if the mode is immediately changed to the PC-FAX mode. However, when the facsimile apparatus receives an AT command while operating in the normal mode, data is lost if the mode is immediately changed to the PC-FAX mode. For this reason, in a conventional apparatus, when an AT command is received from the personal computer while the facsimile apparatus is operating in the normal mode, the user decides whether the AT command is ignored or the mode is changed to the PC-FAX mode, and operates an operation unit of the facsimile apparatus according to predetermined procedures. Moreover, when the facsimile apparatus is operated in the PC-FAX mode and the operation mode is returned to the normal operation mode after the operation in the PC-FAX mode is finished, it is necessary for the user to take the necessary operation procedures.

However, it is inconvenient for the user to perform a mode setting operation every time the mode is changed and erroneous setting is readily made by mis-operation. This reduces communications efficiency.

There are various types of applications software for performing the PC-FAX function according to the types of the personal computers, and how the applications software operates differs according to the types of the personal computers. The applications software transmits ATH0 (on-hook command) which is one of the AT commands to the facsimile apparatus to close the telephone line when the PC-FAX mode is finished. The ATH0 command is also transmitted to close the telephone line when the user performs an interrupt operation.

However, some types of applications software interrupt the operation without transmitting any ATH0 command when the interrupt operation is performed. In such a case, the telephone line is left opened. For example, if a command "call the other end of the line" is transmitted from the personal computer to the facsimile apparatus and the user interrupts the execution of the command while the facsimile apparatus is executing the command, the facsimile apparatus is in an off-hook state where the telephone line is left opened.

In such an interrupted state, since the telephone line is opened, no call can be placed via the outside line and the operation of the facsimile apparatus in the normal mode is impossible. Further, since no command is transmitted to the facsimile apparatus, even if the PC-FAX mode is canceled, the hook state cannot be returned to the on-hook state, which is very disadvantageous.

In such a situation, the hook state may be returned from the off-hook state to the on-hook state by turning off the facsimile apparatus. However, the data stored in the random access memory (RAM) of the facsimile apparatus is lost if the facsimile apparatus is turned off.

SUMMARY OF THE INVENTION

An object of the present invention is to solve the above-described problem associated with the mode change and the interruption of the operation in a facsimile apparatus connected to an external information processor such as a personal computer and operating in a facsimile mode and in a facsimile modem mode.

To achieve the above-mentioned object, in a facsimile apparatus of the present invention, the changeover between the facsimile mode and the facsimile modem mode is automatically made based on whether an AT command is received from the external information processor or not. Specifically, the operation mode is shifted to the facsimile modem mode when an AT command is received while the facsimile machine is in the standby state in the facsimile mode, and the operation mode is shifted to the facsimile mode when no AT command is received within a predetermined period of time after the operation in the facsimile modem mode is finished.

Further, the facsimile apparatus is disconnected from the telephone line in changing the operation mode between the facsimile mode and the facsimile modem mode.

By automatically changing the operation mode, the number of operations necessarily performed by the user is reduced and mis-operation is avoided. As a result, communications efficiency improves. Since the facsimile apparatus does not operate as a facsimile machine while it is in the standby state in the facsimile mode, the problem is avoided that data is lost when the operation mode is changed. Since the operation mode is shifted to the facsimile mode when no AT command is received within a predetermined period of time after the execution of the AT command in the facsimile modem mode, the facsimile apparatus operates as a facsimile machine without the function in the facsimile modem mode being hindered.

In addition, since the facsimile apparatus is disconnected from the telephone line in changing the operation mode, the telephone line is never left opened, so that the telephone line is surely used after the mode is changed.

BRIEF DESCRIPTION OF THE DRAWINGS

These and other objects and features of this invention will become clear from the following description, taken in conjunction with the preferred embodiments with reference to the accompanied drawings in which.

DESCRIPTION OF THE PREFERRED EMBODIMENTS

Figure 1:
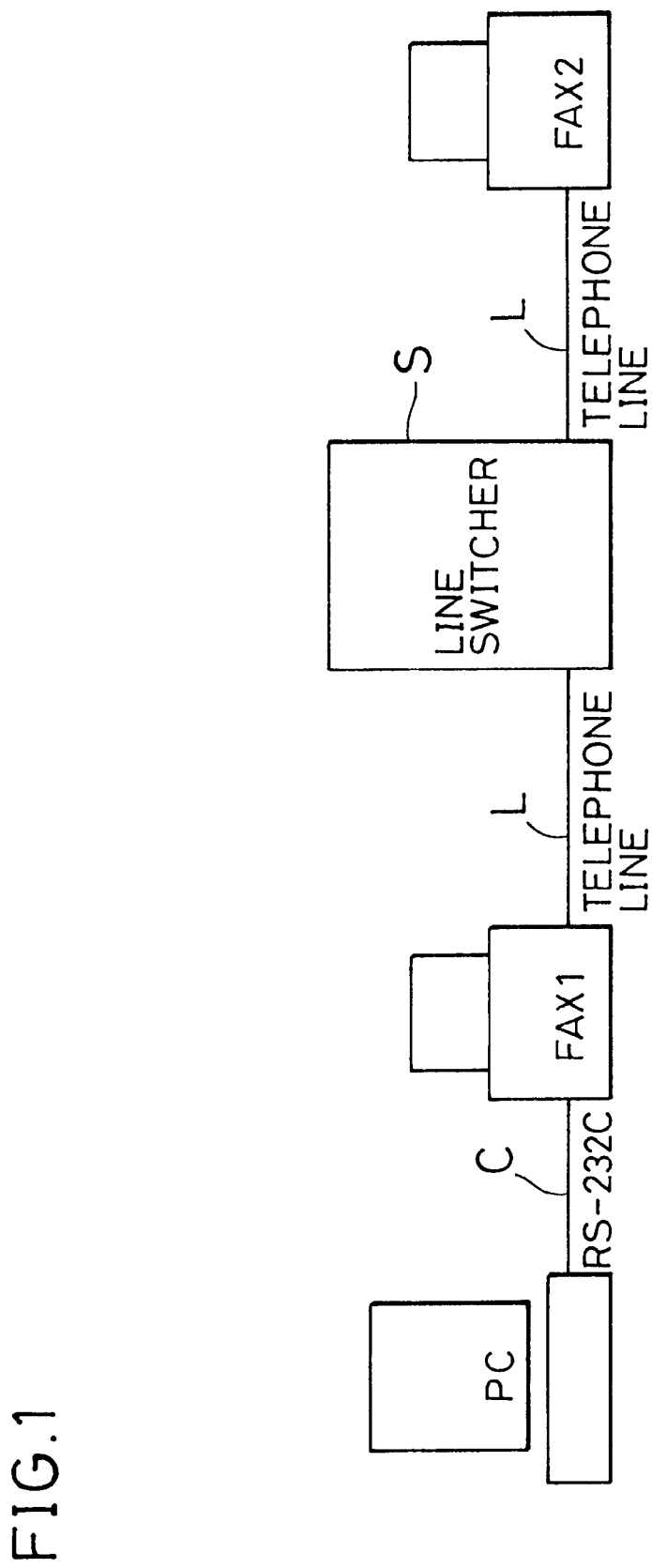
FIG. 1 is a block diagram showing the arrangement of a communications system using a facsimile apparatus of the present invention.

Referring to FIG. 1, there is shown the arrangement of a communications system employing a facsimile apparatus of the present invention. A facsimile apparatus FAX1 of the present invention is connected to a facsimile apparatus FAX2 on the other end of the line by a public telephone line L arranged through a line switcher S at a switching office. To the facsimile apparatus FAX1, a personal computer as an external information processor is connected through a data communications cable C such as an RS-232C cable.

Figure 2:
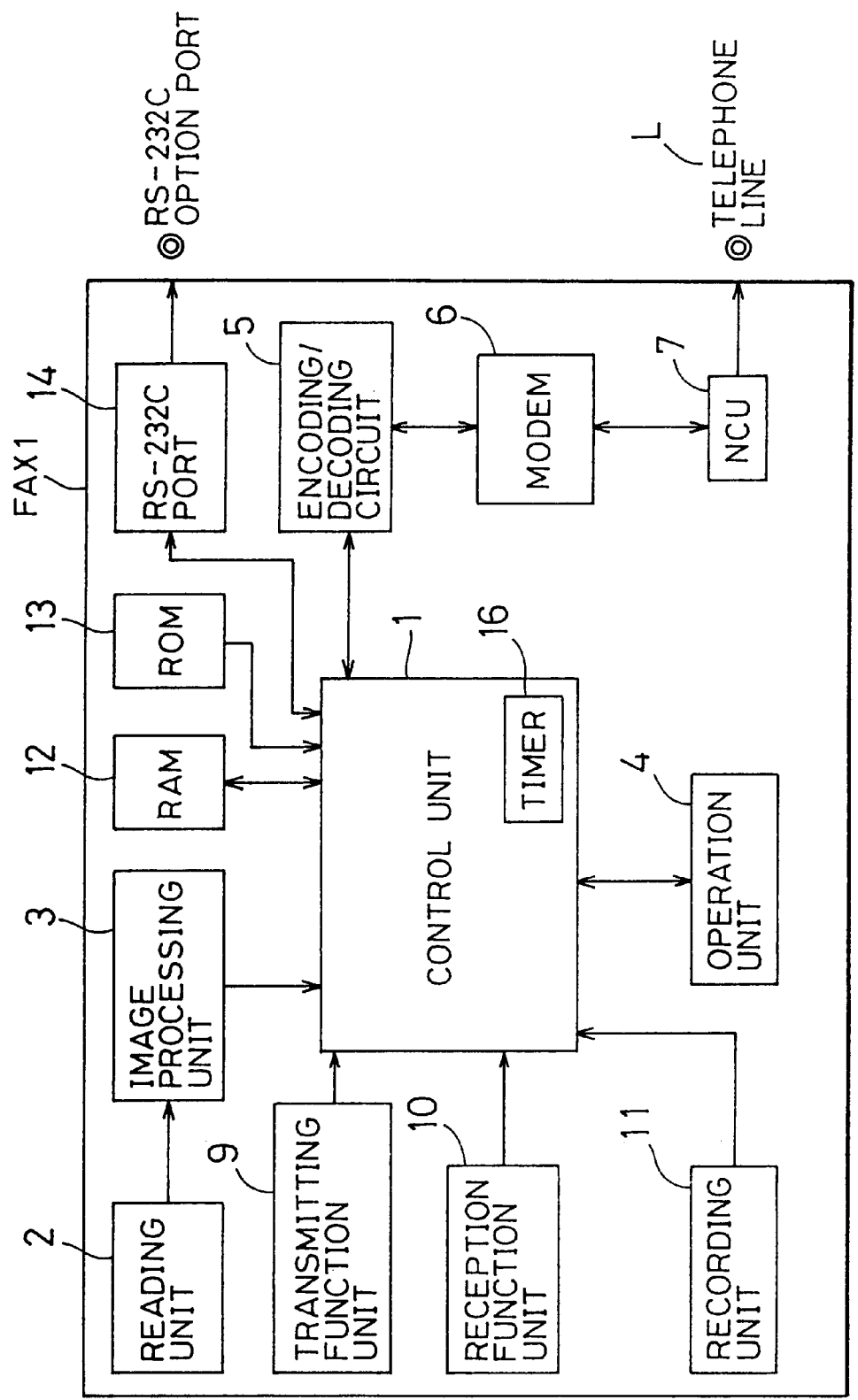
FIG. 2 is a block diagram showing the arrangement of the facsimile apparatus.

Referring to FIG. 2, there is shown a block diagram of the arrangement of the facsimile apparatus FAX1. Reference numeral 1 represents a control unit comprising a microcomputer which controls the entire facsimile apparatus. To the control unit 1, an image data from an image processing unit 3 is supplied. The image processing unit 3 produces an image data by performing half-tone processing and other predetermined image processing on an output signal of a reading unit (scanner) 2 which optically reads out an original to be transmitted. Reference numeral 4 represents an operation unit provided with operation keys. Reference numeral 5 represents an encoding/decoding circuit. Reference numeral 6 represents a modem. Reference numeral 7 represents a network control unit (NCU). The control unit 1 is connected to the public telephone line L through the encoding/decoding circuit 5, the modem 6 and the NCU 7.

Figure 8A:
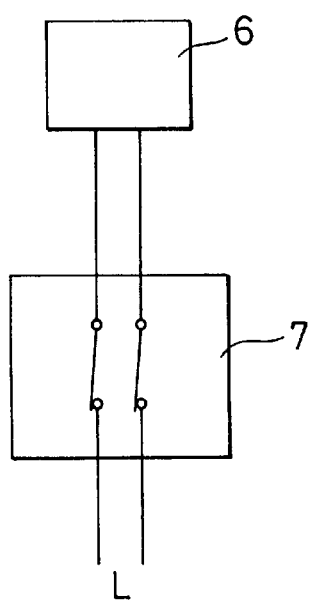
FIG. 8A shows an off-hook state in which the facsimile apparatus is connected to the telephone line.
Figure 8B:
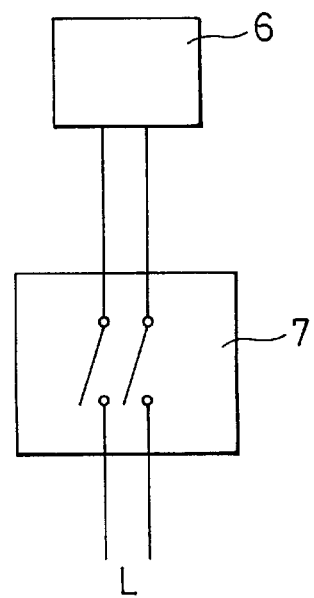
FIG. 8B shows an on-hook state in which the facsimile apparatus is not connected to the telephone line.

The NCU 7 changes the hook state between the off-hook state shown in FIG. 8A and the on-hook state shown in FIG. 8B through control by the control unit 1. In the off-hook state, the modem 6 and the telephone line L are connected so that the communication between the facsimile apparatus FAX1 and the other end of the line is possible. In the on-hook state, the modem 6 and the telephone line L are disconnected from each other.

In FIG. 2, reference numeral 9 represents a transmitting function unit which encodes an image data to be transmitted according to a predetermined encoding method and that produces a control signal necessary for facsimile communications. Reference numeral 10 represents a receiving function unit which decodes a received image data and that executes a predetermined reception controlling protocol. Reference numeral 11 represents a recording unit which records a received image on recording paper. Reference numeral 12 represents a random access memory for temporarily storing data. Reference numeral 13 represents a program storing read only memory (ROM). Reference numeral 14 represents an RS-232C port serving as an interface for data communications. The ROM 13 stores parameters for controlling the entire system and stores programs for controlling the RS-232C port 14 and the AT commands and other necessary programs.

Figure 3:
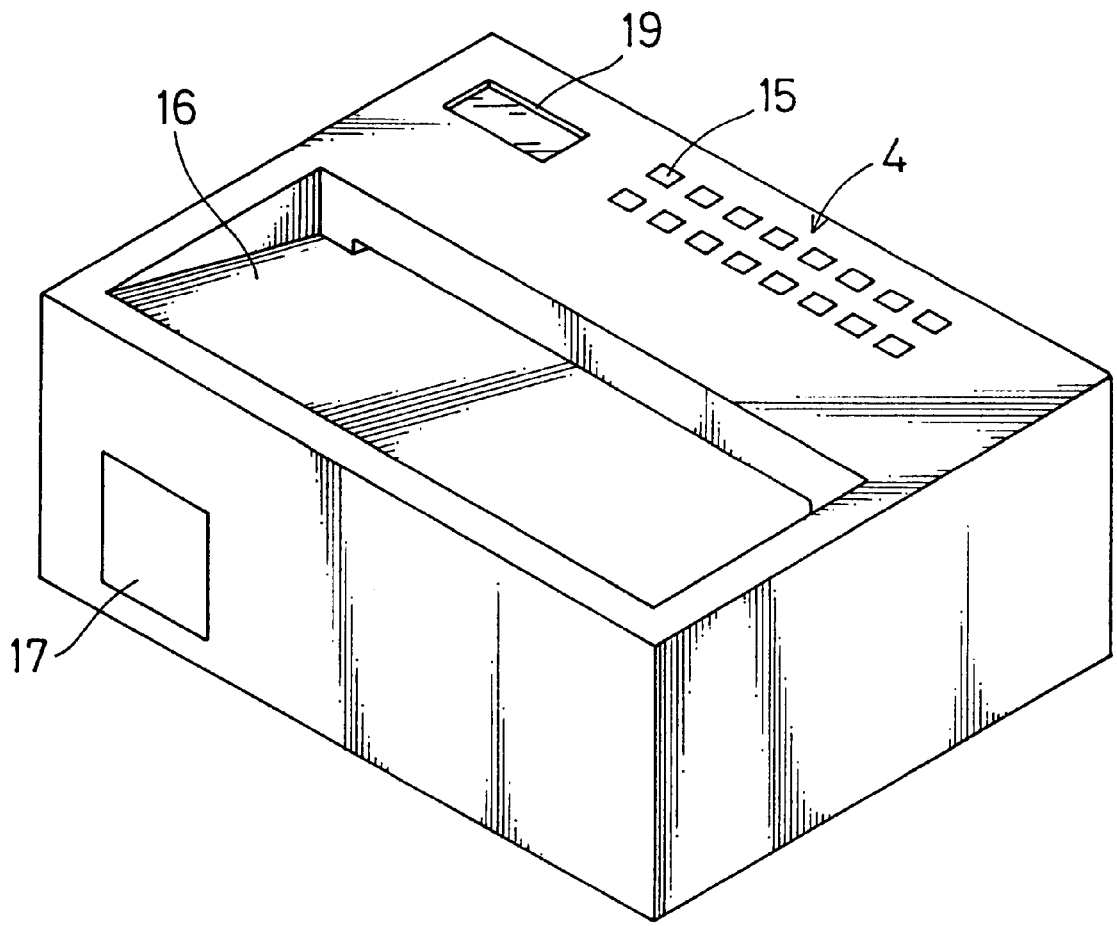
FIG. 3 is a perspective view of the facsimile apparatus.

Referring to FIG. 3, there is schematically shown the appearance of the facsimile apparatus FAX1. On the upper surface, the operation unit 4 including a plurality of keys for inputting telephone numbers and performing various functions, a liquid crystal display 19 and an original stand 16 for feeding an original to the reading unit 2 are provided. The telephone number inputted from the operation unit 4 can be confirmed since it is echo-back-displayed on the display 19. On the back surface of the facsimile apparatus FAX1, a window 17 is provided for cable connection with the personal computer PC. On the front surface, although not shown, a sheet discharging slot is formed for discharging a sheet on which an image has been recorded by the recording unit 11.

Figure 4:
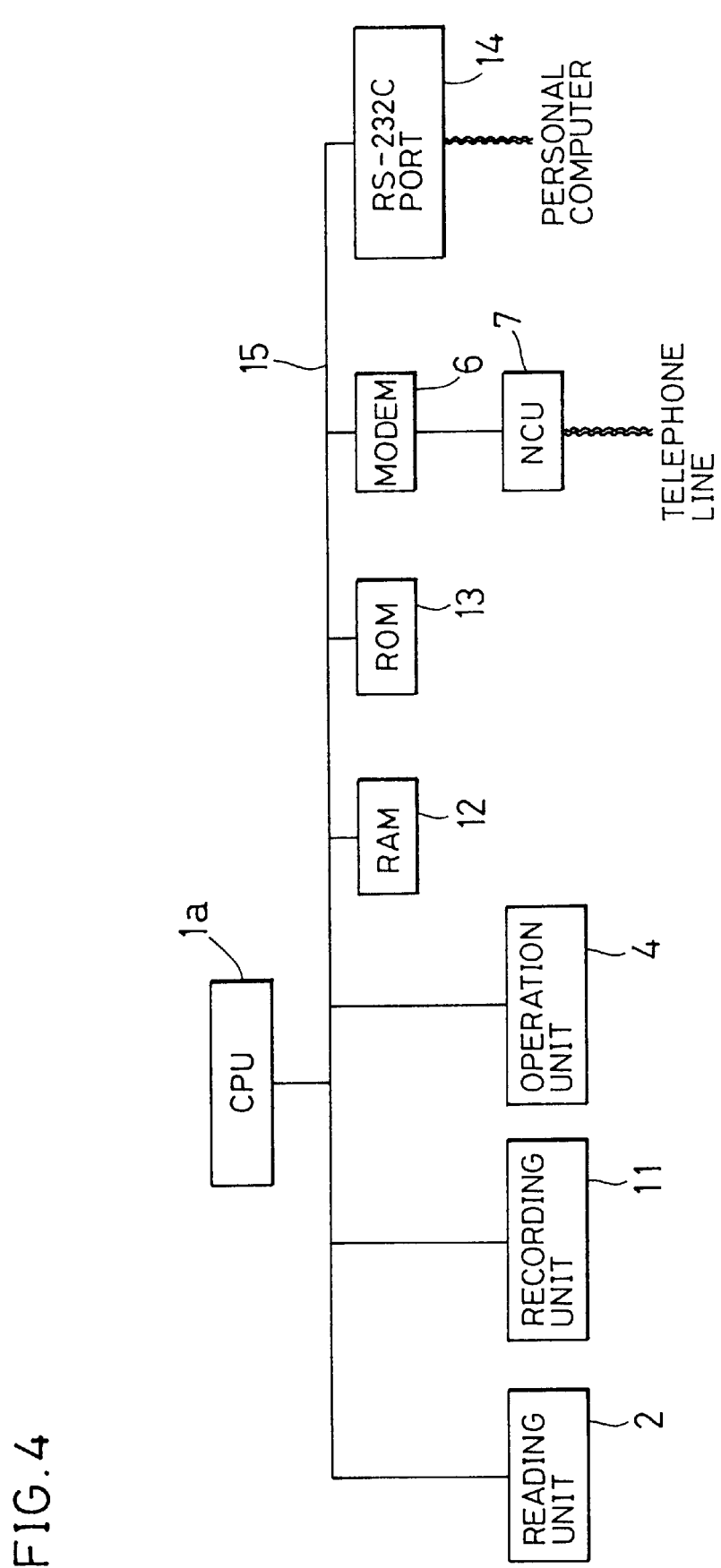
FIG. 4 is a block diagram showing the connection between a control unit and other elements of the facsimile apparatus.

Referring to FIG. 4, there is shown the condition of connection between the control unit and other elements. As shown in the figure, a central processing unit CPU 1a of the control unit 1 is connected to the reading unit 2, the recording unit 11, the operation unit 4, the RAM 12, the ROM 13, the modem 6 and the RS-232C port 14 through a data bus 15. Further, as shown in FIG. 2, a timer 16 is formed in the form of software.

Figure 5:
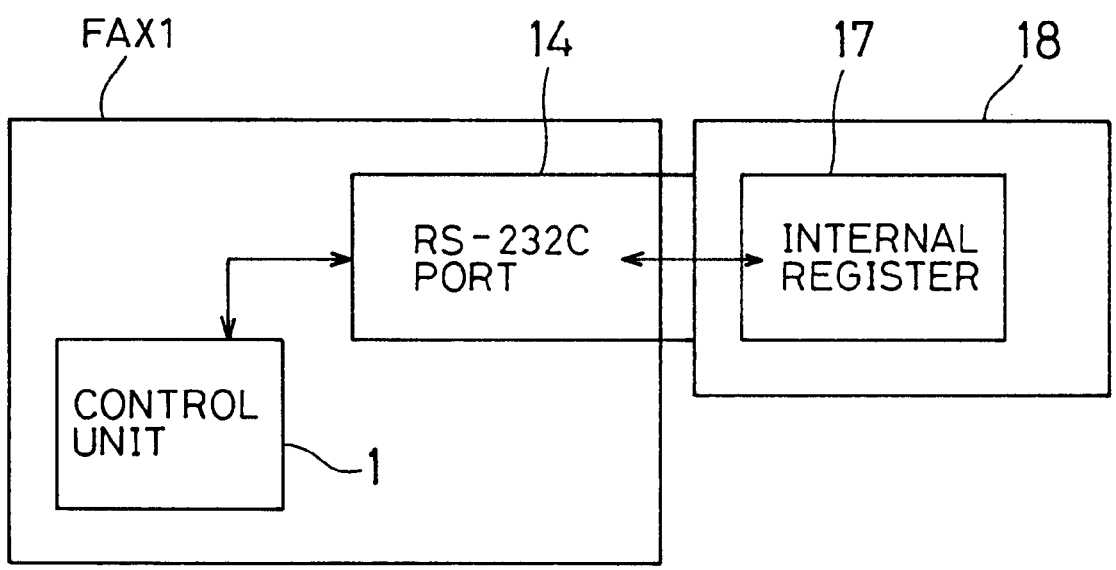
FIG. 5 is a block diagram showing a condition in which an expansion board is connected to the facsimile apparatus.

To the RS-232C port 14, as shown in FIG. 5, an expansion board 18 provided with an internal register is connected. To the expansion board 18, the personal computer PC is connected through the RS-232C cable C so that the facsimile apparatus FAX1 can be used as a facsimile modem.

With this arrangement, the facsimile apparatus FAX1 can be controlled from the personal computer by using AT commands, and facsimile transmission and reception can be performed through the facsimile apparatus FAX1. In addition, the facsimile apparatus FAX1 can be used as a printer and a scanner for the personal computer PC.

This realizes so-called PC-FAX function, and the facsimile apparatus FAX1 operates in the two modes: in the PC-FAX mode to perform data transfer with the personal computer PC; and in the normal mode to operate as a facsimile apparatus without performing data transfer with the personal computer PC.

Data transmission and reception according to the PC-FAX function will be described. In data transmission, first, the operation mode of the facsimile apparatus FAX1 is changed from the normal mode to the PC-FAX mode by an AT command. Then, a calling command and a receiver's telephone number are transmitted from the personal computer PC to the RS-232C port 14 through the cable C. The control unit 1 of the facsimile apparatus FAX1 places a call to a terminal on the receiving side through the telephone line L to connect the line. Then, transmission data are successively transmitted from the personal computer PC to the RS-232C port 14 and outputted to the telephone line L by way of the control unit 1, the encoding/decoding circuit 5, the modem 6 and the NCU 7 to perform transmission.

In data reception, an AT command to instruct the facsimile apparatus FAX1 to be in the standby state in the PC-FAX mode is transmitted from the personal computer PC to the facsimile apparatus FAX1 to change the mode from the normal mode to the PC-FAX mode. When a call comes in while the facsimile apparatus FAX1 is in the standby state under this condition, the control unit 1 transmits the reception data to the personal computer PC through the RS-232C port 14. At this time, the reception data is not outputted to the recording unit 11.

Thus, in data transmission and reception in the PC-FAX mode, the facsimile apparatus FAX1 functions as a facsimile modem.

The facsimile apparatus FAX1 of this embodiment usually operates in the normal mode to function as a facsimile apparatus. The mode is changed to the PC-FAX mode by an AT command from the personal computer PC and returned to the normal mode when a predetermined period has elapsed since the end of execution of the AT command. The change of the operation mode is made by the control unit 1.

Figure 6:
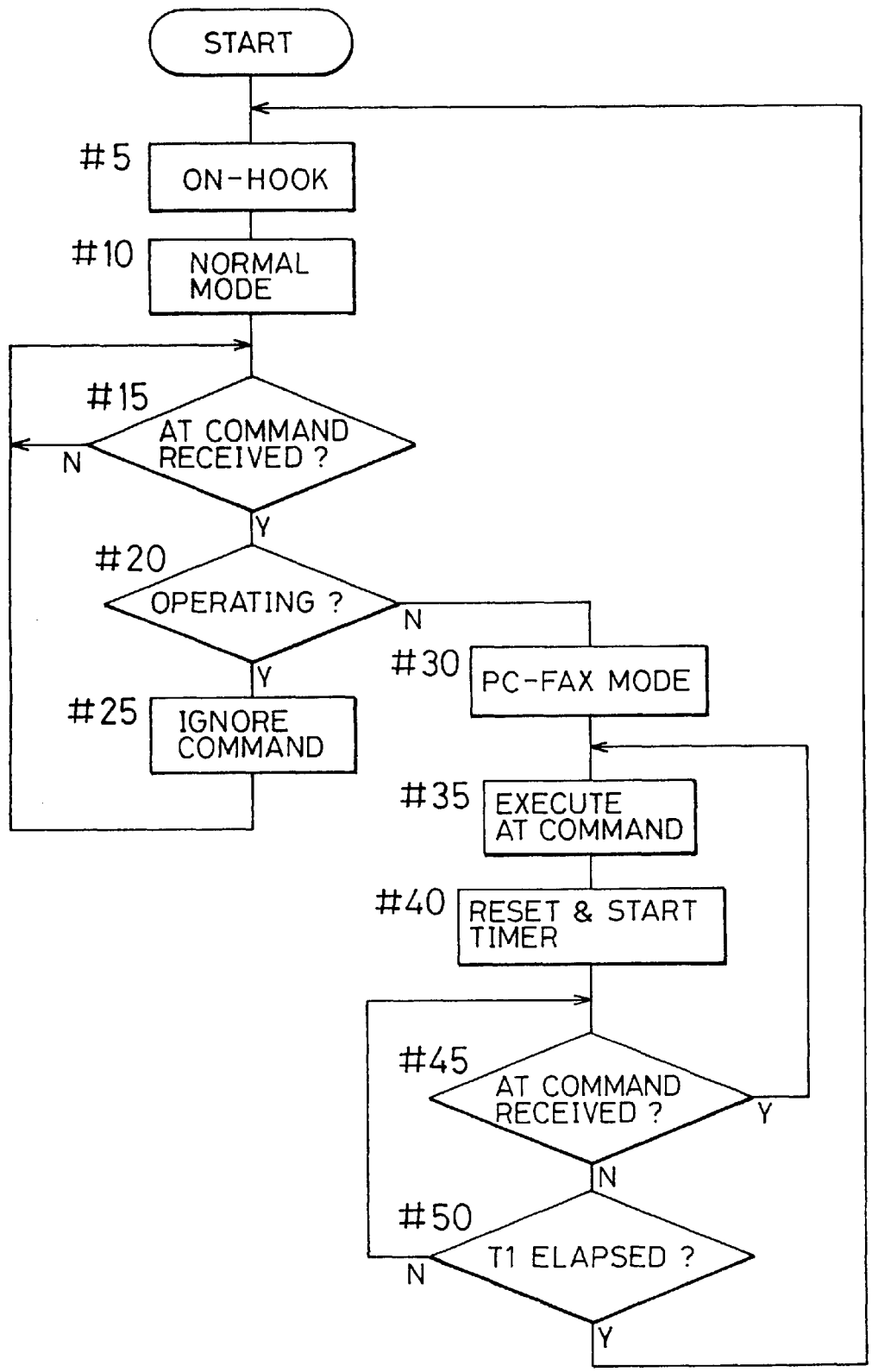
FIG. 6 is the flowchart of a processing performed by the control unit for changing the operation mode of the facsimile apparatus.

Referring to FIG. 6, there is shown the flow of a mode changing processing performed by the control unit 1. After the power is activated, at step #5, the facsimile apparatus FAX1 is set-to the on-hook state (FIG. 8B) in which it is not connected to the telephone line L. Then, the operation mode is set to the normal mode at step #10. At step #15, whether an AT command is received from the personal computer PC or not is determined with the facsimile apparatus FAX1 being in the normal mode. When no AT command is received, the normal mode is maintained to keep the facsimile apparatus FAX1 functioning as a facsimile apparatus.

When an AT command is received, whether the facsimile apparatus FAX1 is operating or not is determined at step #20, and based on the result, how the AT command is handled is determined. Specifically, when the control unit 1 performs communications with any of the transmitting function unit 9, the receiving function unit 10, the recording unit 11, the image processing unit 3, the operation unit 4 and the encoding/decoding circuit 5, the process proceeds to step #25, where the received AT command is ignored to continue the operation in the normal mode. For example, when the facsimile apparatus FAX1 is outputting through the recording unit 11 data received from the facsimile apparatus FAX2 on the other end of the line, the output operation is continued. In this case, an error display such that "no modem is connected" is provided on the personal computer PC. The process to change the mode returns to step #15 to wait for the next AT command from the personal computer PC.

When the facsimile apparatus FAX1 is in the standby state where the control unit 1 performs no communications with the above-described elements, the process proceeds to step #30 to set the PC-FAX mode and the AT command is executed at step #35. After the execution of the AT command, the timer is reset and started at step #40. Then, at step #45, whether the next AT command is received from the personal computer PC or not is determined.

When an AT command is received, the process returns to #35 while the facsimile apparatus FAX1 is still in the PC-FAX mode to execute the AT command. After the execution of the command, the timer is again reset and started at step #40, and whether an AT command is received or not is determined at step #45.

When it is determined at step #45 that no AT command is received, the process proceeds to step #50 to determine whether or not a predetermined time T1 has elapsed since the start of the timer at step #40. In this embodiment, the predetermined time T1 is approximately 30 seconds. When the predetermined time T1 has not elapsed, the process returns to step #45 to determine whether an AT command is received or not. When the predetermined time T1 has elapsed, the process returns to step #5 to set the facsimile apparatus FAX1 to the on-hook state. Then, the operation mode is changed to the normal mode at step #10.

Thus, in the PC-FAX mode, an operation is repeated such that when the next AT command is transmitted within a predetermined period of time after the execution of an AT command, the command is executed. When no AT command is transmitted within the predetermined period of time after the execution of an AT command, the facsimile apparatus FAX1 is set to the on-hook state to return the operation mode to the normal mode.

According to the above mode changing processing, the facsimile apparatus FAX1 normally functions as a facsimile apparatus, and functions as a facsimile modem only when it is not operating as a facsimile apparatus. Further, the mode is automatically changed and it is unnecessary for the user to perform any operation. In addition, even if something is wrong with the personal computer while the facsimile apparatus FAX1 is operating in the PC-FAX mode so that the facsimile apparatus FAX1 is left in the off-hook state, since the facsimile apparatus FAX1 is set to the on-hook state when the mode is changed from the PC-FAX mode to the normal mode, communication with the other end of the line is performed without the facsimile function being deteriorated.

In addition to automatically changing the mode from the PC-FAX mode to the normal mode as described above, the mode change may be manually performed by the user by operating the keys of the operation unit. Specifically, a normal mode setting function is allotted to a predetermined key 15 of the operation unit 4 so that an interrupt processing to change the operation mode from the PC-FAX mode to the normal mode is performed when the key 15 is operated. In this case, the facsimile apparatus FAX1 is set to the on-hook state so that it is not left in the off-hook state.

Figure 7:
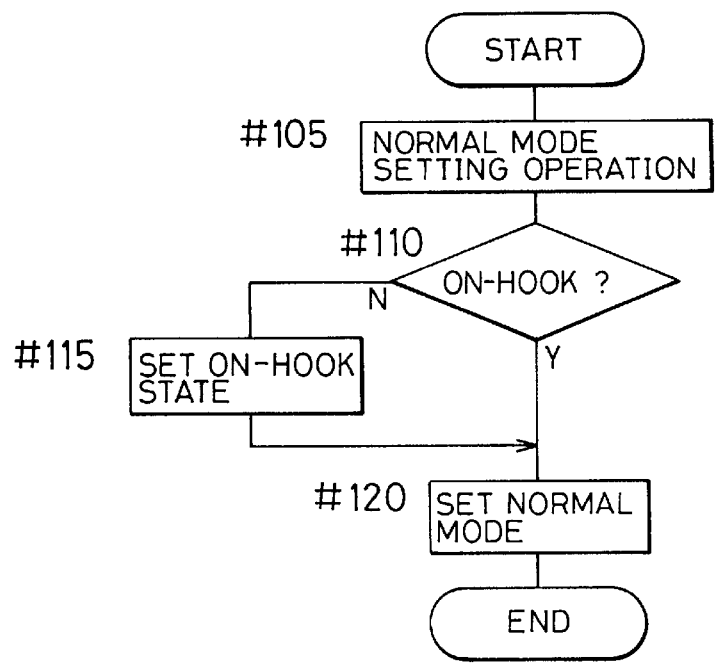
FIG. 7 is the flowchart of a processing performed by the control unit for manually changing the operation mode of the facsimile apparatus.

Referring to FIG. 7, there is shown the flow of the interrupt processing. When a key operation to set the normal mode is performed at step #105, the hook state of the NCU 7 is determined at step #110. When the NCU 7 is in the on-hook state, the process proceeds to step #120 to set the normal mode. When the NCU 7 is in the off-hook state, the hook state is changed to the on-hook state at step #115 and the normal mode is set at step #120.

With such a processing, the mode is changed from the PC-FAX mode to the normal mode by the user's intention, and a problem is avoided that the facsimile apparatus FAX1 does not function as a facsimile apparatus.

Obviously, many modifications and variations of the present invention are possible in light of the above teachings. It is therefore to be understood that within the scope of the appended claims, the invention may be practiced other than as specifically described.

What is claimed is:

1. A facsimile apparatus connected to an external information processor, said facsimile apparatus having a first mode in which the facsimile apparatus operates as a facsimile apparatus and a second mode in which the facsimile apparatus operates as a facsimile modem, wherein controlling means is provided for automatically changing an operation mode from the second mode to the first mode in a preset period of time after an operation in the second mode is finished when no command related to the second mode is given by the information processor during the period.

2. A facsimile apparatus according to claim 1, wherein said controlling means changes the operation mode to the second mode when an AT command is received from the external information processor while the facsimile apparatus is in a standby state in the first mode.

3. A facsimile apparatus according to claim 2, wherein said controlling means does not change the operation mode when an AT command is received from the external information processor while the facsimile apparatus is operating in the first mode.

4. A facsimile apparatus according to claim 1, wherein said facsimile apparatus is connected to a personal computer serving as the external information processor.

5. A facsimile apparatus according to claim 4, further comprising a scanner for reading out an original image and a recording unit for outputting an image onto a sheet, wherein said scanner and said recording unit are used as an image inputting apparatus and an image outputting apparatus of the personal computer.

6. A facsimile apparatus as recited in claim 1 wherein said preset period of time is determined by a timer of said controlling means, and said timer is reset by said controlling means to restart the preset period if an AT command is received while the timer is operating.

7. A facsimile apparatus as recited in claim 6 wherein the preset period is about 30 seconds.

8. A facsimile apparatus as recited in claim 1 further comprising means for manually changing from the second mode to the first mode.

9. A facsimile apparatus as recited in claim 8 wherein said means for manually changing from the second mode to the first mode includes an operation unit with a manual change-over activation key.

10. A facsimile apparatus connected to an external information processor, said facsimile apparatus having a first mode in which the facsimile apparatus operates as a facsimile apparatus and a second mode in which the facsimile apparatus operates as a facsimile modem, wherein controlling means is provided for automatically changing an operation mode from the second mode to the first mode and disconnecting the facsimile apparatus from a telephone line, in a preset period of time after an operation in the second mode is finished when no command related to the second mode is given by the information processor during the period, and wherein switching means is provided for manually changing the operation mode from the second mode to the first mode, said switching means disconnecting the facsimile apparatus from the telephone line before changing the operation mode when the facsimile apparatus is connected to the telephone line.

11. A facsimile apparatus according to claim 10, wherein said controlling means changes the operation mode to the second mode when an AT command is received from the external information processor while the facsimile apparatus is in a standby state in the first mode.

12. A facsimile apparatus according to claim 11, wherein said controlling means does not change the operation mode when an AT command is received from the external information processor while the facsimile apparatus is operating in the first mode.

13. A facsimile apparatus according to claim 10, wherein said facsimile apparatus is connected to a personal computer serving as the external information processor.

14. A facsimile apparatus according to claim 13, further comprising a scanner for reading out an original image and a recording unit for outputting an image onto a sheet, wherein said scanner and said recording unit are used as an image inputting apparatus and an image outputting apparatus of the personal computer.

15. A facsimile apparatus according to claim 10, wherein said preset period of time is determined by a timer of said controlling means, and said timer is reset by said controlling means to restart the preset period if an AT command is received while the timer is operating.

16. A facsimile apparatus according to claim 15, wherein the preset period is about 30 seconds.

17. A facsimile apparatus according to claim 10, wherein said switching means includes an operation unit with a manual change-over activation key.

* * * * *